United States Patent
Birnbaum et al.

(10) Patent No.: US 7,624,309 B2
(45) Date of Patent: Nov. 24, 2009

(54) AUTOMATED CLIENT RECOVERY AND SERVICE TICKETING

(75) Inventors: Aaron R. Birnbaum, Brier, WA (US); Richard L. Wright, III, Redmond, WA (US); Paul A. Just, Sammamish, WA (US); Jared W. Wilson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 407 days.

(21) Appl. No.: 11/653,491

(22) Filed: Jan. 16, 2007

(65) Prior Publication Data

US 2008/0172421 A1    Jul. 17, 2008

(51) Int. Cl.
*G06F 11/00*    (2006.01)
(52) U.S. Cl. .............................. 714/57; 714/4; 379/9.03
(58) Field of Classification Search ........................ None
See application file for complete search history.

(56) References Cited

U.S. PATENT DOCUMENTS

| | | | |
|---|---|---|---|
| 5,467,449 A * | 11/1995 | Gauronski et al. ............ 714/57 |
| 6,052,695 A | 4/2000 | Abe et al. .................... 707/202 |
| 6,581,166 B1 | 6/2003 | Hirst et al. ...................... 714/4 |
| 6,854,069 B2 * | 2/2005 | Kampe et al. .................... 714/4 |
| 6,883,119 B1 * | 4/2005 | Bette et al. ..................... 714/43 |
| 6,981,039 B2 * | 12/2005 | Cerami et al. ................ 709/223 |
| 7,006,603 B2 * | 2/2006 | Boetje et al. ................ 379/9.03 |
| 7,360,123 B1 * | 4/2008 | Westenberg et al. ........... 714/47 |
| 2002/0087680 A1 * | 7/2002 | Cerami et al. ................ 709/224 |
| 2003/0196148 A1 * | 10/2003 | Harrisville-Wolff et al. ... 714/47 |
| 2004/0153693 A1 * | 8/2004 | Fisher et al. .................... 714/4 |
| 2004/0172574 A1 | 9/2004 | Wing et al. ..................... 714/4 |
| 2005/0081118 A1 * | 4/2005 | Cheston et al. ............... 714/47 |
| 2006/0107088 A1 * | 5/2006 | Katayama et al. ............... 714/4 |
| 2006/0187818 A1 | 8/2006 | Fields, Jr. et al. ........... 370/216 |
| 2006/0198386 A1 | 9/2006 | Liu et al. ..................... 370/419 |
| 2006/0215581 A1 | 9/2006 | Castagnoli .................. 370/254 |
| 2006/0233311 A1 * | 10/2006 | Adams et al. ................. 379/21 |
| 2007/0226259 A1 * | 9/2007 | Kacin et al. .............. 707/104.1 |
| 2007/0277061 A1 * | 11/2007 | Ashe ........................... 714/57 |
| 2009/0013222 A1 * | 1/2009 | Di Luoffo et al. ............. 714/57 |

OTHER PUBLICATIONS

Muriel, Médard; Finn, Steven G.; Barry, Richard A.; "WDM Loop-Back Recovery In Mesh Networks," University of Illinois at Urbana, Urbana, IL; Massachusetts Institute of Technology, Cambridge, MA; Sycamore Networks, Tewskbury, MA.

(Continued)

*Primary Examiner*—Christopher S McCarthy
(74) *Attorney, Agent, or Firm*—Merchant & Gould P.C.

(57) ABSTRACT

Automated client recovery and service ticketing may be provided. Client computers in a lab environment that become disconnected from a client management system may be recovered using an automated client recovery. Computers in a computer lab may be monitored to determine if a computer becomes disconnected from the client management system. If a computer is unresponsive with the client management system, an automated client recovery and service ticketing script is implemented to recover the unresponsive computer. If solutions within in the automated client recovery and service ticketing script do not recover the unresponsive computer, a service call request is automatically generated for the computer for subsequent examination by a lab engineer.

19 Claims, 4 Drawing Sheets

OTHER PUBLICATIONS

Muriel, Médard; Lumetta, Steven S.; "Network Reliability and Fault Tolerance," Massachusetts Institute of Technology; University of Illinois Urbana-Champaign.

Čičić, Tarik; Hansen, Audun Fosselie; Gjessing, Stein; Lysne, Olav; "Applicability of Resilient Routing Layers for $k$-Fault Network Recovery," Simula Research Laboratory, Forneby, Norway.

* cited by examiner

AUTOMATED CLIENT RECOVERY AND SERVICE TICKETING

BACKGROUND

Automated client recovery is a process for recovering one or more computers that have become disconnected from a client management system. In some situations, computers used in a lab environment, for example, a bank of computers used to perform software testing and diagnostics, may become disconnected from a client management system. For each computer disconnected from the client management system, a total computer processing capacity for the lab environment is diminished. The conventional strategy relies upon manual intervention to recover the disconnected computer. However, manual recovery of computers is tedious and inefficient, especially for lab environments having computers numbering in the thousands.

In view of the foregoing, methods and systems for automated client recovery more optimally are provided. Furthermore, there is need for automated client recovery that automatically recovers computers that are disconnected from a client management system and provides automated service ticketing for computers that cannot be recovered using automated recovery. It is with respect to these and other considerations that the present invention has been made.

SUMMARY

Automated client recovery and service ticketing may be provided. This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Automated client recovery and service ticketing may be provided. Client computers in a lab environment that become disconnected from a client management system may be recovered using an automated client recovery. Computers in a computer lab may be monitored to determine if a computer becomes disconnected from the client management system. If a computer is unresponsive with the client management system, an automated client recovery and service ticketing script is implemented to recover the unresponsive computer. If solutions within in the automated client recovery and service ticketing script do not recover the unresponsive computer, a service call request is automatically generated for the computer for subsequent examination by a lab engineer.

In accordance with one embodiment, a method is provided for automated client recovery and service ticketing by identifying non-responsive computers in a computer lab. Upon identifying the non-responsive computers, a cause for the computers' non-responsiveness is identified. The method attempts to recover the non-responsive computers using an automated client recovery and service ticketing script. The method also requests a service call for those non-responsive computers that are not fixed by the automated client recovery and service ticketing script.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Automated client recovery and service ticketing may be provided. Consistent with embodiments of the present invention, a method and system for automated client recovery and service ticketing is disclosed. Often computers in a lab environment become disconnected from a client management system for one or more reasons, for example, a user may set one or more computers to work offline during testing, but forget to reconnect the computers to the client management system when the user has completed testing. Accordingly, when computers become disconnected from the client management system, processing capacity for the client management system decreases. Accordingly, it is imperative to recover the disconnected computers to maintain processing capacity. However, recovering disconnected computers manually can be tedious and time consuming, especially when a large number of computers are used in the lab environment. In addition, the lab environment may not reside in a location readily available to provide constant manual maintenance. Accordingly, an embodiment of the invention may provide a user with a method for automated client recovery and service ticketing for disconnected computers in a client management system.

An embodiment consistent with the invention may include a system for automated client recovery and service ticketing. The system may comprise a memory storage and a processing unit coupled to the memory storage. The processing unit may be operative to remotely identify one or more computers in a client management system that are non-responsive to system communications. Upon identifying non-responsive computers, the system may also remotely identify a cause for the non-responsive system communications when the one or more computers in the client management system that are non-responsive to system communications. The system may remotely recover the one or more computers that are non-responsive to system communications using a script that includes a set of recovery solutions. The system may remotely request a service call for the one or more computers that are non-responsive to system communications when the recovery solutions fail to recover the one or more computers.

Figure 1:
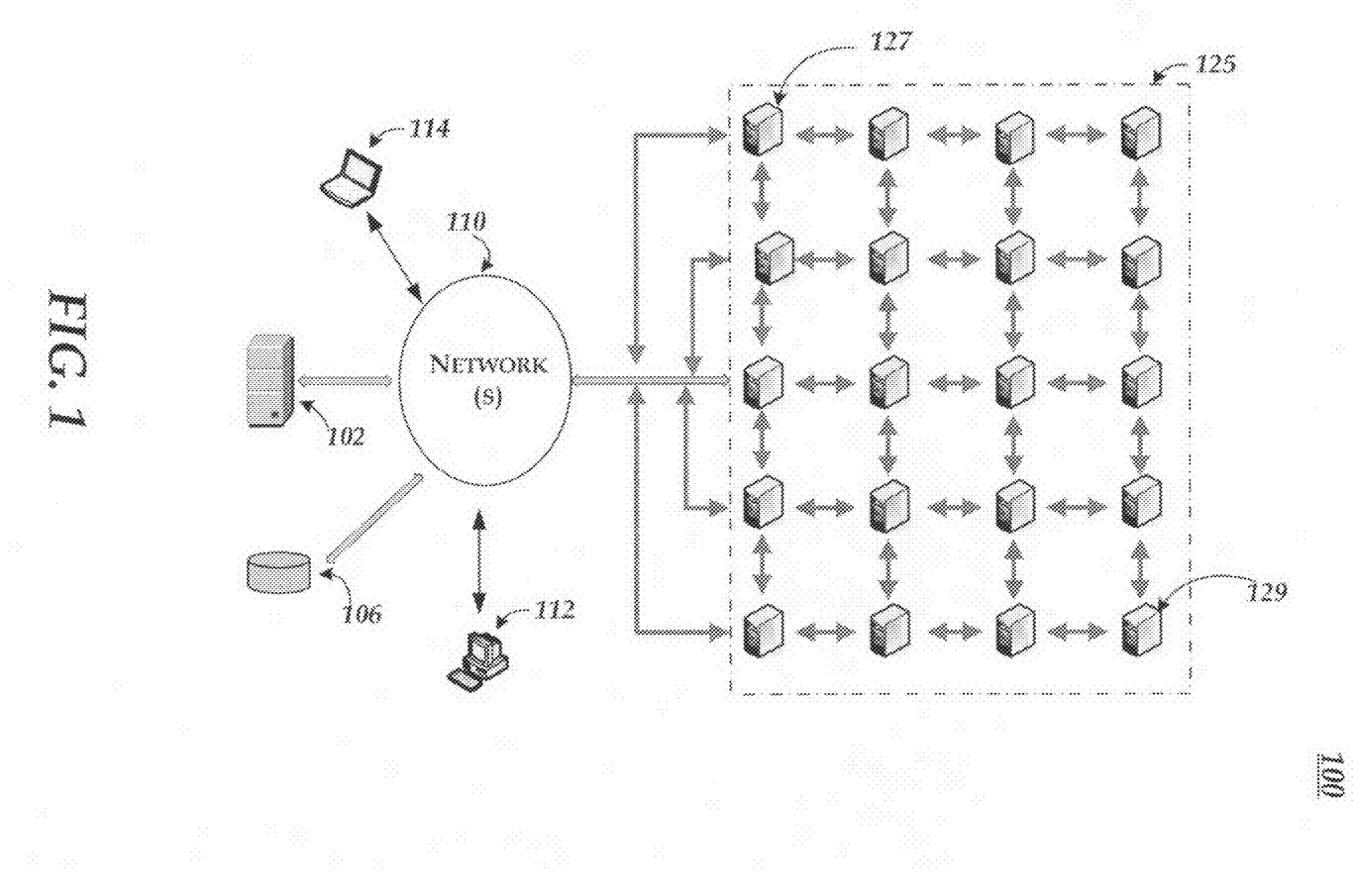
FIG. 1 illustrates a networked operating environment where embodiments may be practiced.

Referring to FIG. 1, a client management system 100 is illustrated where example embodiments may be implemented. The client management system 100 may include a computer network 110, a server 102 which manages a database 106, a desktop computer 112, a laptop computer 114, and a computer lab 125 that includes one or more computers, for example, computer 127 and computer 129.

Client management system 100 may transmit and receive data to and from other computing devices such as the server 102, the desktop computer 112, the laptop computer 114, and the computer lab 125 using the computer network 110. Furthermore, the client management system 100 may transmit or receive data to a storage system 106, which is managed by server 102 using the computer network 110. Other computing devices may also participate in the client management system 100. The computer network 110 may include a secure network such as an enterprise network, or an unsecure network such as a wireless open network. By way of example, and not limitation, the computer network 110 may include wired media such as a wired network or direct-wired connection, and wireless media such as acoustic, RF, infrared and other wireless media.

Figure 2:
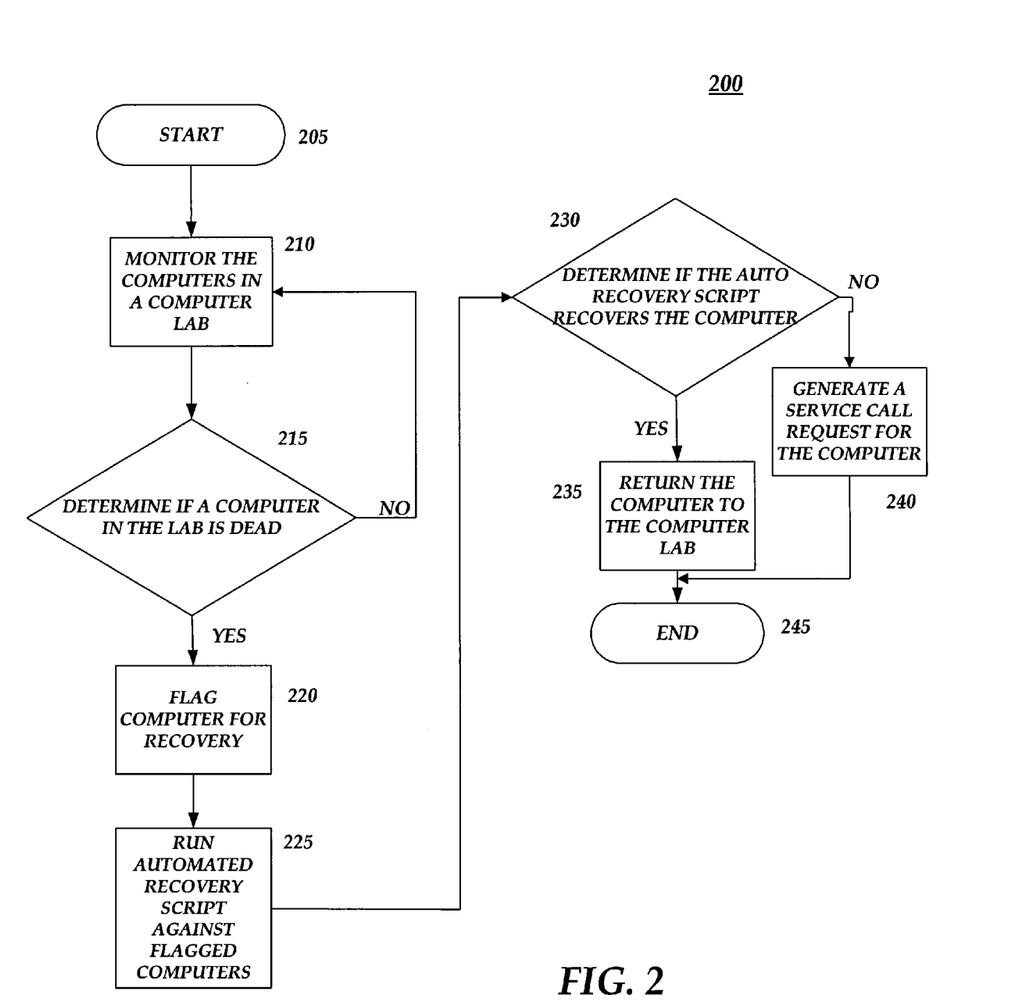
FIG. 2 is a flow chart of a method for automated client recovery and service ticketing.

FIG. 2 is a flow chart setting forth the general stages involved in a method 200 consistent with an embodiment of the invention for automated client recovery and service ticketing using a computing device of FIG. 1. Ways to implement the stages of method 200 will be described in greater detail below. Method 200 may begin at starting block 205 and proceed to stage 210 where the server 102 monitors computer connectivity for each computer the computer lab 125. For example, the server 102 monitors computer 127 to determine if the computer 127 is responsive to system communications. Communications between each computer and the server 102 may occur using standard communications, keyboard, video and mouse Internet protocols (KVM/IP), or the like. Next at stage 215, the server 102 may determine if each computer in the computer lab is connected to the computer network 110. If a computer, for example, computer 127 is not connected to the computer network 110, the computer 127 is deemed "dead". Computer 127 may be dead for many reasons, for example, failed communications during a re-imaging process, improper installation of clients, domain structure problems, testing errors, machine code errors, or a programmer using the computer 127 offline.

If a computer in the computer lab 125 is deemed dead, at stage 220, the computer is flagged for recovery. At stage 225, a computer recovery script may be run on any computers that are flagged for recovery. The computer recovery script may utilize a series of solutions for recovering a dead computer. For example, the computer recovery script may contain a recovery solution for recovering a dead computer that has encountered domain structure problems. Next at stage 230, the server 102 determines if the computer recovery script solved all problems for each computer flagged for recovery.

If the computer recovery script solves the problem for a computer flagged for recovery, at stage 235, the recovery flag is removed and the computer is moved back to an available computer pool for use in the computer lab 125. Accordingly, communication is restored and the computer may be used as a resource once again. If the computer recovery script does not recover the flagged computer, at stage 240, the server 102 automatically generates a service call request for the computer. Accordingly, a lab engineer, or the like, may then interact with those computers that were unsuccessfully recovered using the computer recovery script. At stage 245, the method 200 ends.

Figure 3:
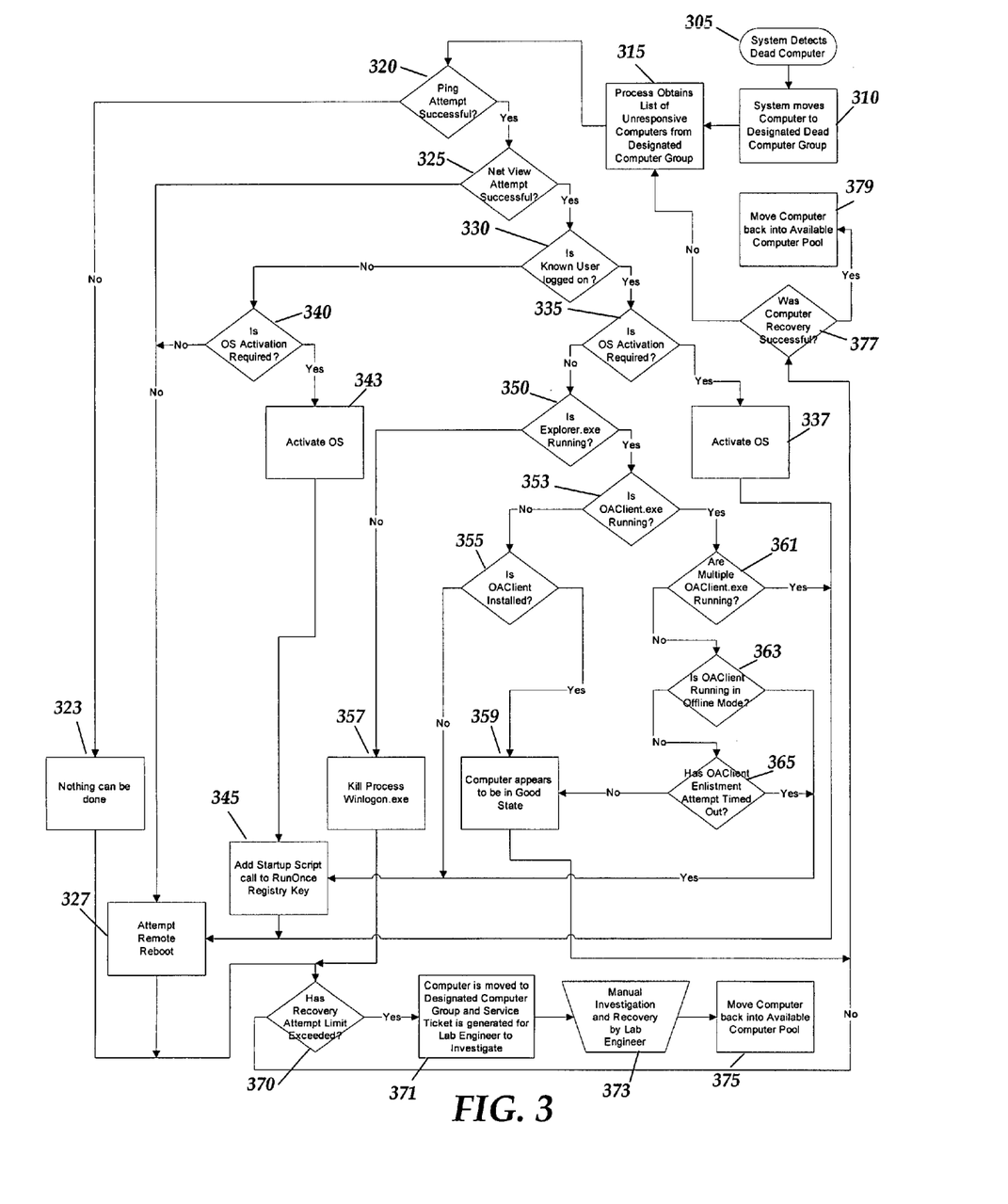
FIG. 3 is a detailed flow chart of a method for automated client recovery and service ticketing.

FIG. 3 is a detailed flow chart setting forth the general stages involved in a method 300 consistent with an embodiment of the invention for automated client recovery and service ticketing, according to one embodiment. At stage 305, the server 102 detects if any computers in the computer lab 125 are dead, for example, computer 129, by running an automated client recovery and service ticketing script. Next, at stage 310, the server 102 flags all problematic computers for recovery. Next, at stage 315, a list of dead computers is compiled. At stage 320, each computer flagged for recovery is pinged to determine if the computer is connected to the computer network 110. If the computer is unsuccessfully pinged, the method 300 moves to stage 323 in which the computer is moved to the "nothing can be done" group. Next, at stage 370, the server 102 determines if a computer recovery limit has been reached.

If a ping attempt is successful at stage 320, at stage 325, the server 102 attempts to confirm connectivity between the computer and the computer network 110. If the computer connectivity is not confirmed, at stage 327, the server 102 attempts to reboot the computer. If the computer connectivity is confirmed, at stage 330, the server 102 determines if a user is logged onto the computer. If the server 102 determines that a user is not logged onto the computer, at stage 340, the server 102 determines if an operating system (OS) for the computer requires activation. If the server 102 determines that a user is logged onto the computer, at stage 335, the server 102 determines if the operating system (OS) for the computer requires activation. At stages 335 and 340, if OS activation is required, next at stages 337 and 343, the OS for the computer is activated.

At stage 340, if OS activation is not required, the server 102 will attempt to reboot the computer at stage 327. At stage 335, if OS activation is not required, at stage 350, the server 102 determines if a shell, for example, Microsoft Windows® is running on the computer to determine if a user is interacting with the computer. If the shell is not running, the server 102, at stage 357, runs a kill process to shut down the computer. If the shell is running on the computer, the method 300 proceeds to stage 353 where the server 102 determines if a client daemon, for example, an "Office Automation Client" (OAClient) is running on the computer. The client daemon may be used to perform various automation and tasks on the computer. If the client daemon is operating on the computer, at stage 361, the server 102 determines if multiple client daemons are running on the computer in order to determine if duplicate processes are running on the computer. If multiple client daemons are running on the computer, the server 102 will attempt to reboot the computer at stage 327. If multiple client daemons are not operating on the computer, at stage 363, the server 102 determines if the client daemon on the computer is running in an offline mode. If the client daemon is operating in an offline mode, the method 300 proceeds to stage 345 where the server 102 adds a startup script call to a run once registry to provide communications with the client daemon. If the client daemon is not operating in an offline mode, the server 102 determines if the client daemon enlistment timed out at stage 365.

If the client daemon enlistment has timed out, the method 300 proceeds to stage 345 where the server 102 adds a startup script call to a run once registry. If the client daemon enlistment has not timed out, at stage 359, the server 102 lists the computer as being in good condition. The method 300 proceeds to stage 377 where the server 102 may determine if the computer has been successfully recovered. If the computer is successfully recovered, at stage 379 the server 102 removes the recovery flag and the computer is moved into an available pool group for subsequent use. If the computer is not successfully recovered, the method 300 proceeds to stage 315.

If, at stage 353, the server 102 determines that the client daemon is not running on the computer, at stage 355, the server 102 determines if the client daemon is installed on the computer. If the client daemon is installed on the computer, the server 102 moves the computer to a good condition group (stage 359). If the client daemon is not installed on the computer, the method 300 proceeds to stage 345 where the server 102 adds a startup script call to a run once registry.

After the method 300 is at stage 345, the method proceeds to stage 327 where the server 102 attempts to reboot the computer. When the method 300 proceeds to stage 370 from stages 323, 327 and 357, if the server 102 determines that an attempt recovery limit has not been exceeded, the method 300 proceeds to stage 377. If the attempt recovery limit has been exceeded, at stage 371, the computer is moved to a predetermined service group and a service ticket is issued for the computer by the server 102. Next at stage 373, a lab engineer receives the service ticket and conducts an investigation into the computer's non-responsiveness. Upon recovering the computer by the lab engineer, the method 300 proceeds to stage 375, where the computer is moved into an available pool group for subsequent use.

Figure 4:
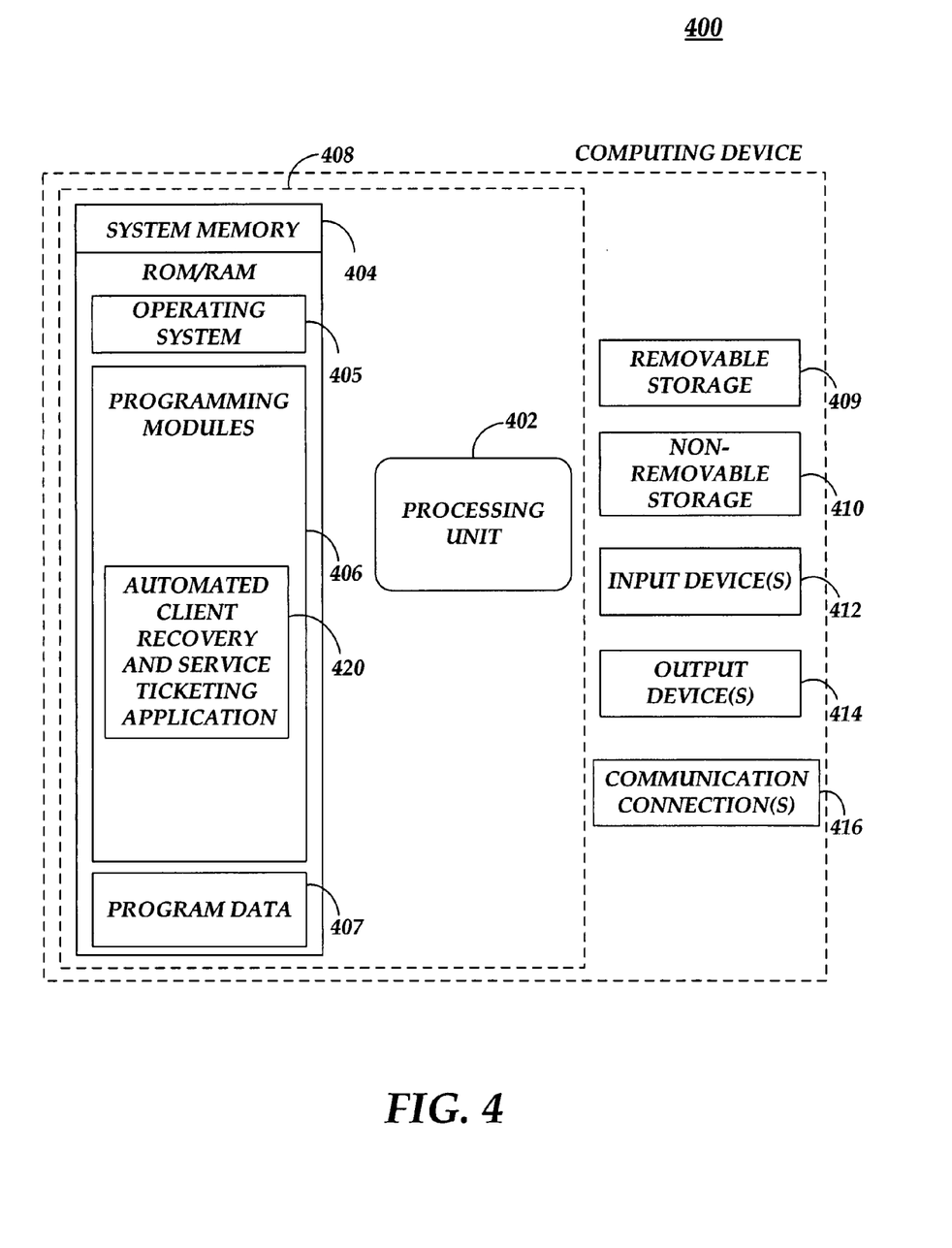
FIG. 4 is a block diagram of a system including a computing device for use in the networked operating environment of FIG. 1.

FIG. 4 is a block diagram of a system including a computing device 400, which may be used in conjunction with server 102, desktop computer 112, laptop computer 114 and computer lab 125. Consistent with an embodiment of the invention, any suitable combination of hardware, software, or firmware may be used to implement a memory storage and processing unit. For example, the memory storage and processing unit may be implemented with the computing device 400 or any of the other computing devices in combination with the computing device 400. The aforementioned system, device, and processors are examples and other systems, devices, and processors may comprise the aforementioned memory storage and processing unit, consistent with embodiments of the invention. Furthermore, the computing device 400 may comprise an operating environment for an associated system. The system may operate in other environments and is not limited to computing device 400.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may include a program data 407. Operating system 405, for example, may be suitable for controlling computing device 400's operation. In one embodiment, programming modules 406 may include a document creation application for creating and editing a document. Programming modules 406 may include an automated client recovery and service ticketing application 420 for automatically recovering computers using a script. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also employ input device(s) 412 such as a keyboard, a mouse, a pen, a sound input device, a touch input device, etc. Output device(s) 414 such as a display, speakers, a printer, etc. may also be included. The aforementioned devices are examples and others may be used.

Computing device 400 may also contain a communication connection 416 that may allow device 400 to communicate with other computing devices, such as over network 110 in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 404, including operating system 405. While executing on processing unit 402, programming modules 406 may perform processes including, for example, one or more method stages as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Consistent with embodiments of the present invention, an automated client recovery and service ticketing script is used to automatically recover one or more computers in a lab environment. Computers that cannot be utilized as a lab resource because a client management system cannot communicate with the computers may be efficiently recovered using an automated process. Accordingly, a lab engineer does not have to manually interact with all dead computers, which could be tedious and time consuming in a lab environment having thousands of computers. The lab engineer need only interact with computers that could not be recovered using the automated client recovery and service ticketing script.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as show in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for automated client recovery and service ticketing, the method comprising:
   remotely identifying one or more computers that are non-responsive to system communications, wherein identifying one or more computers that are non-responsive to system communications further comprises determining whether a computer of the one or more computers is active by monitoring shell activity for the one or more computers;
   remotely identifying a cause for the non-responsive system communications of the one or more computers;
   remotely recovering the one or more computers that are non-responsive to system communications using a script that includes a set of recovery solutions; and
   requesting a service call for the one or more computers that are non-responsive to system communications when the recovery solutions fail to recover the one or more computers.

2. The method of claim 1, wherein identifying one or more computers that are not responsive to system communications further comprises pinging the one or more computers.

3. The method of claim 2 further comprising determining whether a user is logged onto a client management system through the one or more computers.

4. The method of claim 1 further comprising determining whether a client is installed on the one or more computers.

5. The method of claim 1, wherein requesting the service call occurs after a predetermined number of attempts to remotely recover the one or more computers.

6. The method of claim 1, wherein remotely recovering the one or more computers further comprises rebooting the one or more computers.

7. The method of claim 1, wherein each computer is grouped according to predetermined conditions.

8. The method of claim 7, wherein a predetermined condition is a dead condition.

9. The method of claim 1, wherein remotely recovering the one or more computers is automated.

10. The method of claim 1, wherein remotely requesting a service call is automated.

11. A system for automated client recovery and service ticketing, the system comprising:
    a memory storage for storing an automated client recovery and service ticketing script, wherein the memory storage is searchable;
    a processing unit coupled to the memory storage, wherein the processing unit is operative to:
    remotely identify one or more computers that are non-responsive to system communications, wherein identifying one or more computers that are non-responsive to system communications comprises determining whether a computer of the one or more computers is active by monitoring shell activity for the computer;
    remotely identify a cause for the non-responsive system communications of the one or more computers;
    remotely recover the one or more computers that are non-responsive to system communications using a script that includes a set of recovery solutions; and
    request a service call for the one or more computers that are non-responsive to system communications when the recovery solutions fail to recover the one or more computers.

12. The system of claim 11, wherein the automated client recovery and service ticketing script is stored in a server.

13. The system of claim 11, wherein identifying one or more computers that are not responsive to system communications further comprises pinging the one or more computers.

14. The system of claim 13, wherein the processing unit is further operative to determine whether a user is logged onto a client management system through the one or more computers.

15. The system of claim 11, wherein remotely recovering the one or more computers is automated.

16. A computer-readable storage medium comprising a computer data storage device which stores a set of instructions which when executed performs a method for automated client recovery and service ticketing, the method executed by the set of instructions comprising:
    remotely identifying one or more computers that are non-responsive to system communications at a predetermined time interval, wherein identifying one or more computers that are non-responsive to system communications further comprises determining whether a computer of the one or more computers is active by monitoring shell activity for the computer;
    grouping the one or more non-responsive computers;
    remotely identifying a cause for the non-responsive system communications of the one or more computers;
    remotely recovering the one or more computers that are non-responsive to system communications using a script that include a set of recovery solutions;
    remotely requesting a service call for the one or more computers that are non-responsive to system communications when the recovery solutions fail to recover the one or more computers; and
    receiving input at a keyboard, video and mouse connection for manually recovering the non-responsive one or more computers.

17. The computer-readable storage medium of claim 16, wherein identifying one or more computers that are not responsive to system communications further comprises pinging the one or more computers.

18. The computer-readable storage medium of claim 17 further comprising determining whether a user is logged onto a client management system through the one or more computers.

19. The computer-readable storage medium of claim 16, wherein requesting the service call occurs after a predetermined number of attempts to remotely recover the one or more computers.

\* \* \* \* \*